(12) United States Patent
Higashiyama et al.

(10) Patent No.: US 9,855,818 B2
(45) Date of Patent: Jan. 2, 2018

(54) EVAPORATOR WITH COOL STORAGE FUNCTION

(71) Applicant: KEIHIN THERMAL TECHNOLOGY CORPORATION, Oyama-shi (JP)

(72) Inventors: Naohisa Higashiyama, Oyama (JP); Osamu Kamoshida, Oyama (JP)

(73) Assignee: KEIHIN THERMAL TECHNOLOGY CORPORATION, Oyama-shi (JP)

(*) Notice: Subject to any disclaimer, the term of this patent is extended or adjusted under 35 U.S.C. 154(b) by 210 days.

(21) Appl. No.: 14/741,492

(22) Filed: Jun. 17, 2015

(65) Prior Publication Data

US 2015/0360534 A1 Dec. 17, 2015

(30) Foreign Application Priority Data

Jun. 17, 2014 (JP) ................................. 2014-123918
Apr. 17, 2015 (JP) ................................. 2015-084745

(51) Int. Cl.
| | |
|---|---|
| *F25D 11/00* | (2006.01) |
| *B60H 1/00* | (2006.01) |
| *F28D 20/02* | (2006.01) |
| *F28D 20/00* | (2006.01) |

(52) U.S. Cl.
CPC ......... *B60H 1/005* (2013.01); *B60H 1/00335* (2013.01); *F28D 20/02* (2013.01); *F28D 2020/0013* (2013.01); *Y02E 60/145* (2013.01)

(58) Field of Classification Search
CPC .. B60H 1/005; B60H 1/0033; B60H 1/10035; F28D 20/02; F28D 2021/0085; F28D 2020/0013; F25B 39/022; Y02E 60/145
See application file for complete search history.

(56) References Cited

U.S. PATENT DOCUMENTS

| | | | |
|---|---|---|---|
| 2004/0093889 A1 | 5/2004 | Bureau et al. | |
| 2010/0065244 A1* | 3/2010 | Yokoyama | F28D 1/05383 165/10 |
| 2010/0307180 A1 | 12/2010 | Yamada et al. | |

(Continued)

FOREIGN PATENT DOCUMENTS

| | | |
|---|---|---|
| JP | 4043776 B2 | 9/2002 |
| JP | 2011-12947 | 1/2011 |
| JP | 2014-124971 | 7/2014 |

*Primary Examiner* — Elizabeth Martin
(74) *Attorney, Agent, or Firm* — Mori & Ward, LLP

(57) ABSTRACT

A cool storage material container of an evaporator with a cool storage function includes a container main body portion located within the range of a heat exchange core section in the air-passing direction and an outward projecting portion projecting from the container main body portion. A cool storage material containing portion provided in the cool storage material container has a first containing portion which is present in a region where only the container main body portion is provided, and a second containing portion which extends upward from the first containing portion and is present in a region where the container main body portion and the outward projecting portion are provided. The level of a cool storage material is located within the vertical range of the second containing portion in the case where the cool storage material is in liquid phase at ordinary temperature.

7 Claims, 11 Drawing Sheets

(56) References Cited

U.S. PATENT DOCUMENTS

| | | | |
|---|---|---|---|
| 2011/0154855 A1* | 6/2011 | Sasaki | F25B 39/022 62/524 |
| 2011/0239696 A1* | 10/2011 | Takagi | B60H 1/00335 62/524 |
| 2013/0212881 A1* | 8/2013 | Kamoshida | B23K 1/0012 29/890.07 |
| 2014/0165647 A1* | 6/2014 | Hirayama | F25B 39/022 62/515 |
| 2014/0174121 A1 | 6/2014 | Hirayama et al. | |

* cited by examiner

EVAPORATOR WITH COOL STORAGE FUNCTION

BACKGROUND OF THE INVENTION

The present invention relates to an evaporator with a cool storage function.

For example, in order to protect the environment and improve fuel consumption of automobiles, there has been proposed an automobile designed to automatically stop the engine when the automobile stops, for example, to wait for a traffic light to change.

However, an ordinary car air conditioner has a problem in that, when an engine of an automobile in which the air conditioner is mounted is stopped, a compressor driven by the engine is stopped, and supply of refrigerant (medium for conveying cool) to an evaporator stops, whereby the cooling capacity of the air conditioner drops sharply.

As one measure to solve such a problem, imparting a cool storage function to the evaporator has been considered, to thereby enable cooling of a vehicle compartment by releasing the cool stored in the evaporator, when the compressor stops as a result of stoppage of the engine.

Such an evaporator with a cool storage function is known (see Japanese Patent Application Laid-Open (kokai) No. 2011-12947). The known evaporator includes a plurality of tube pairs each of which is composed of two flat refrigerant flow tubes and which are disposed in a heat exchange core section of the evaporator such that they are spaced from one another in the thickness direction of the refrigerant flow tubes. The two flat refrigerant flow tubes of each pair are disposed such that their longitudinal direction coincides with the vertical direction, their width direction coincides with an air-passing direction, and they are spaced from each other in the air-passing direction. Each of clearances is formed between adjacent tube pairs. One cool storage material container charged with a cool storage material is disposed in each of a plurality of clearances which are a portion of all the clearances, and is brazed to the corresponding refrigerant flow tubes. One fin is disposed in each of the remaining clearances, and is brazed to the corresponding refrigerant flow tubes. The fin is disposed in at least one of the clearances on the opposite sides of the clearance in which the cool storage material container is disposed. The entirety of the cool storage material container is located within the range of the heat exchange core section in the air-passing direction. A cool storage material containing portion whose width in the air-passing direction is constant over the entire height of the cool storage material container is provided in the cool storage material container. A cool storage material is charged into the cool storage material containing portion.

In general, a paraffin-based latent heat storage material (e.g., pentadecane, tetradecane, or the like) whose freezing point is adjusted to about 5° C. to 10° C. is used as a cool storage material which is charged into cool storage material containers of such an evaporator with a cool storage function. For example, in the evaporator with a cool storage function disclosed in Japanese Patent No. 4043776, tetradecane whose melting point is 6° C. is used as a cool storage material which is charged into cool storage material containers.

However, within the range of temperature of an environment in which the evaporator is used (e.g., within a range of −40° C. to 90° C.), the density of the cool storage material in liquid phase changes and air remaining in each cool storage material container thermally expands. As a result, the cool storage material container may break due to the internal pressure, depending on the cool storage material charging ratio, which is the ratio of the volume of the charged cool storage material to the internal volume of one closed space in the cool storage material container. Accordingly, from the viewpoint of safety, the cool storage material charging ratio must be decreased.

Incidentally, in the evaporator with a cool storage function disclosed in Japanese Patent Application Laid-Open (kokai) No. 2011-12947, the entirety of each cool storage material container is located within the range of the heat exchange core section in the air-passing direction, the cool storage material containing portion whose width in the air-passing direction is constant over the entire height of the cool storage material container is provided in the cool storage material container, and the cool storage material is charged into the cool storage material containing portion. Therefore, in the case where the above-mentioned cool storage material charging ratio is set to a low value, the level of the cool storage material in liquid phase must be relatively low, and the following problem occurs. Namely, when the evaporator with a cool storage function is incorporated into an air conditioner for a vehicle together with a compressor and a condenser, in general, the evaporator is disposed in a vertical attitude in a casing such that the heat exchange core section is located in an air passage. Therefore, the cool storage material is not present in a relatively large portion of the cool storage material container on the upper side thereof. As a result, the upper portion of the cool storage material container cannot accumulate cool, which causes a problem in that, when the compressor stops, the temperature of air flowing through a portion of the heat exchange core section, which portion corresponds to the upper portions of the cool storage material containers where the cool storage material is not present, increases more quickly than the temperature of air flowing through the remaining portion of the heat exchange core section, which portion corresponds to the remaining portions of the cool storage material containers where the cool storage material is present, and blown air temperature, which is the temperature of air passing through the evaporator with a cool storage function varies greatly.

SUMMARY OF THE INVENTION

An object of the present invention is to solve the above-mentioned problem and to provide an evaporator with a cool storage function which can prevent breakage of cool storage material containers and which can suppress variation in blown air temperature at the time of release of cool.

An evaporator with a cool storage function according to the present invention comprises a plurality of flat refrigerant flow tubes disposed in parallel in a heat exchange core section thereof such that the refrigerant flow tubes are spaced from one another in a thickness direction of the refrigerant flow tubes, a longitudinal direction of the refrigerant flow tubes coinciding with a vertical direction, and a width direction of the refrigerant flow tubes coinciding with an air-passing direction, whereby each of clearances is formed between adjacent refrigerant flow tubes; cool storage material containers each of which is charged with a cool storage material, which are disposed in a plurality of clearances which are a portion of all the clearances, and which are brazed to the corresponding refrigerant flow tubes; and fins which are disposed in the remaining clearances and which are brazed to the corresponding refrigerant flow tubes. One of the fins is disposed in at least one of clearances on opposite sides of a clearance in which one of the cool storage material containers is disposed. A cool storage material containing portion is provided in each cool storage material container, and the cool storage material is charged into the cool storage material containing portion. Each cool storage material container includes a container main body portion located within a range of the heat exchange core section in the air-passing direction, and an outward projecting portion which connects with only an upper portion of at least one of leeward and windward edges of the container main body portion, which projects outward of the refrigerant flow tubes in the air-passing direction, and whose length in the vertical direction is shorter than that of the container main body portion. The cool storage material containing portion is provided to extend over the container main body portion and the outward projecting portion. The cool storage material containing portion has a first containing portion which is present in a region of the cool storage material container where only the container main body portion is provided, and a second containing portion which extends upward from the first containing portion and extends over the container main body portion and the outward projecting portion in a region of the cool storage material container where the container main body portion and the outward projecting portion are provided. The level of the cool storage material is located within a vertical range of the second containing portion of the cool storage material containing portion in the case where the cool storage material is in liquid phase at ordinary temperature.

DESCRIPTION OF THE PREFERRED EMBODIMENT

An embodiment of the present invention will next be described with reference to the drawings.

In the following description, the downstream side in an air-passing direction (a direction represented by arrow X in FIGS. 1 through 3 and FIG. 7) will be referred to as the "front," and the opposite side as the "rear." Also, the upper, lower, left-hand, and right-hand sides of an evaporator as viewed rearward from the front side correspond to the upper, lower, left-hand, and right-hand sides of FIG. 1.

Furthermore, the term "aluminum" as used in the following description encompasses aluminum alloys in addition to pure aluminum.

Figure 1:
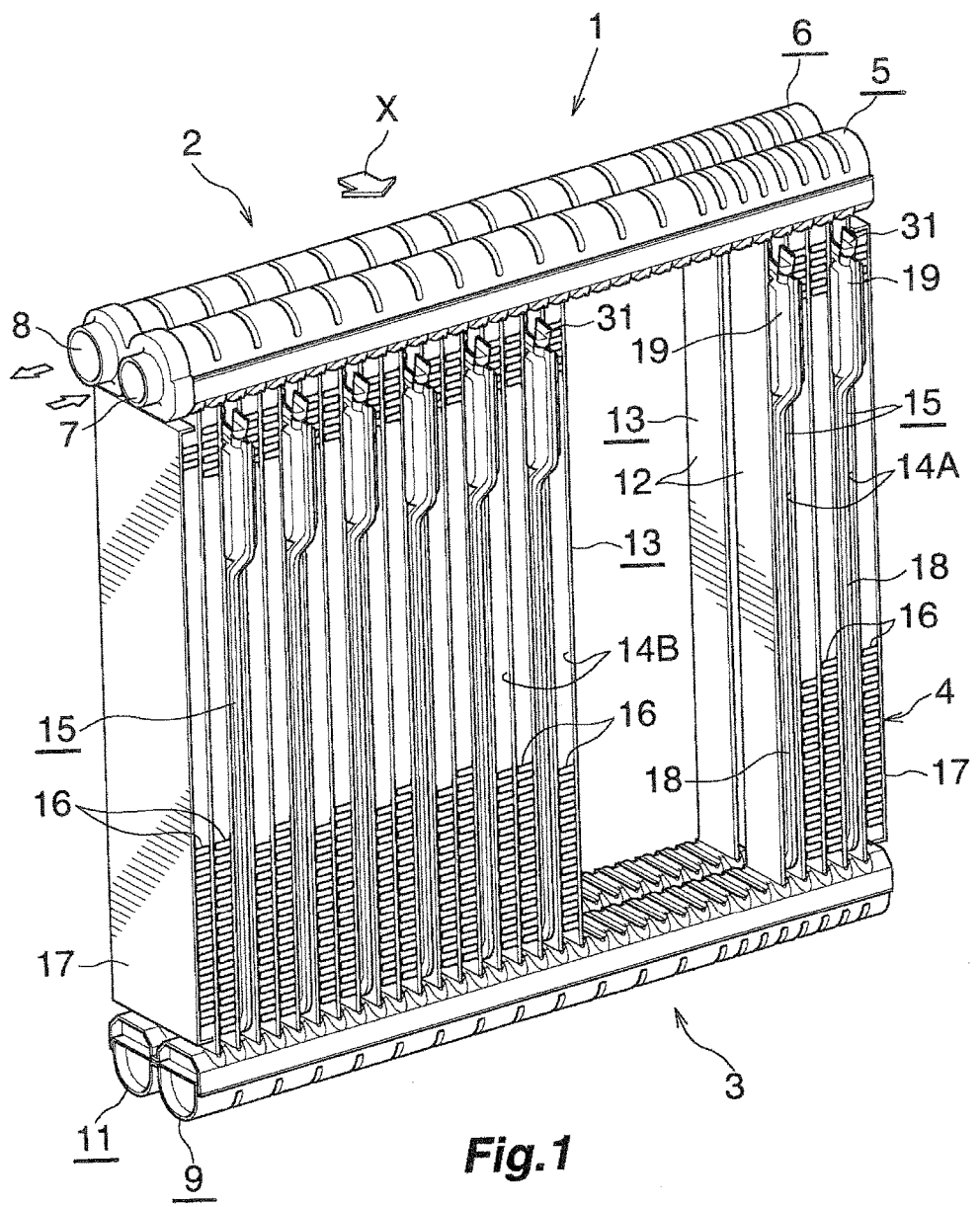
FIG. 1 is a partially cut-away perspective view showing the overall structure of an evaporator with a cool storage function according to the present invention.
Figure 2:
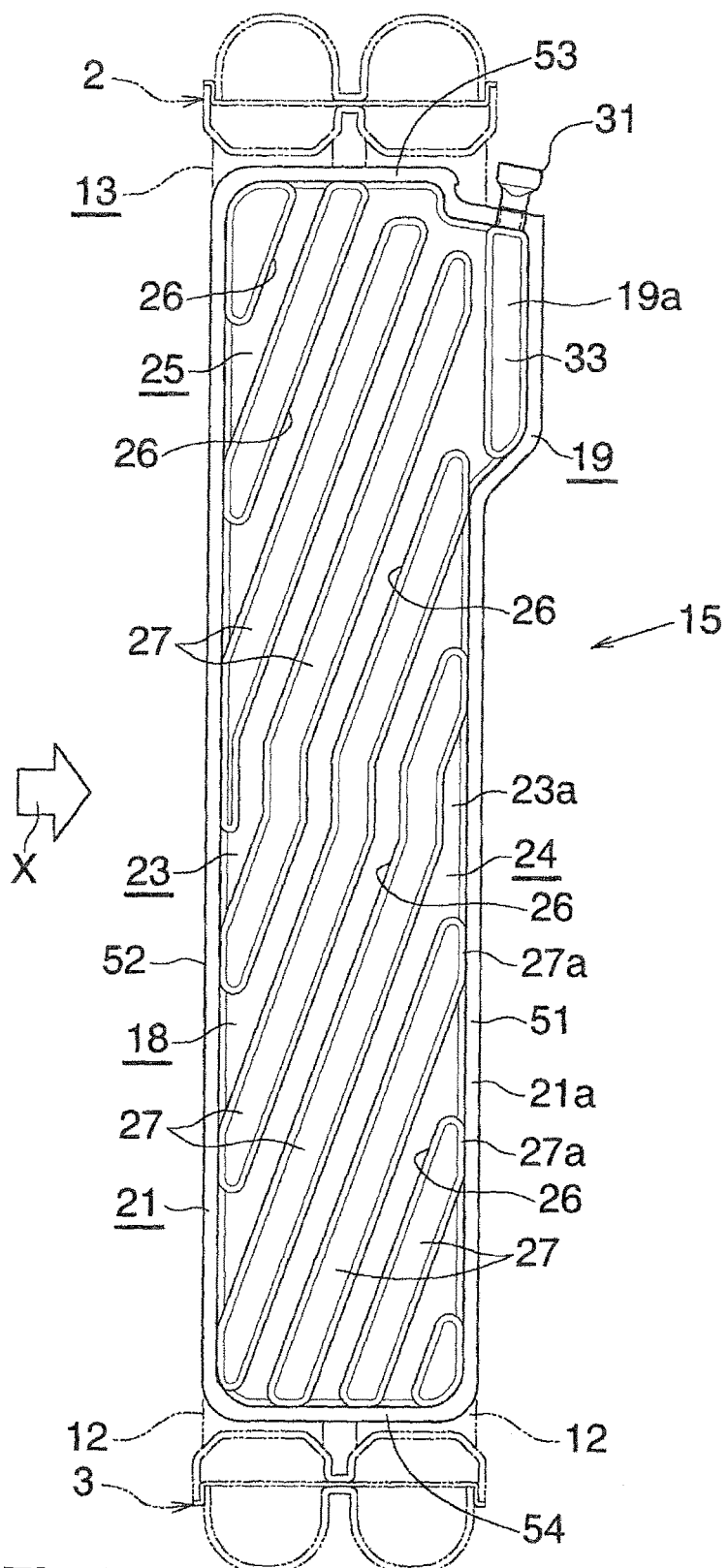
FIG. 2 is a left side view of a cool storage material container used in the evaporator with a cool storage function of FIG. 1.
Figure 3:
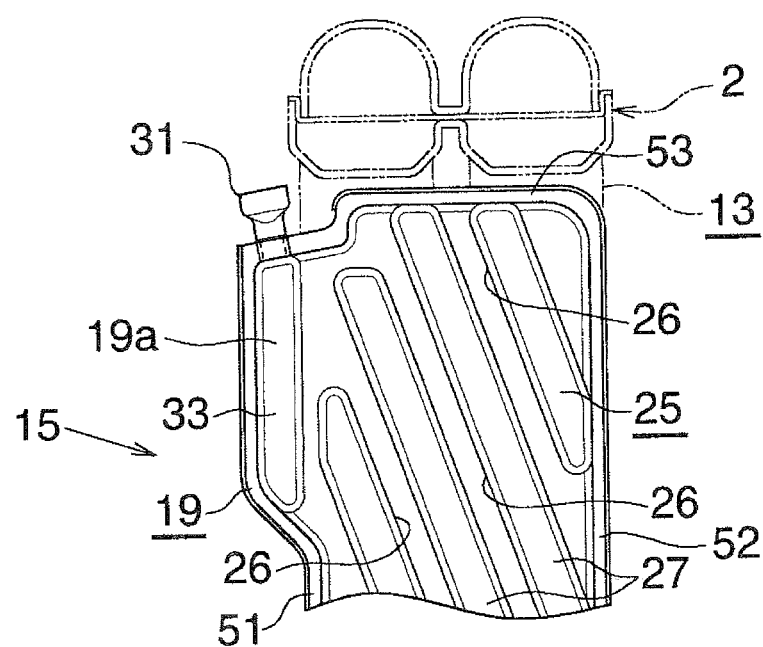
FIG. 3 is a right side view showing a portion of the cool storage material container used in the evaporator with a cool storage function of FIG. 1.
Figure 4:
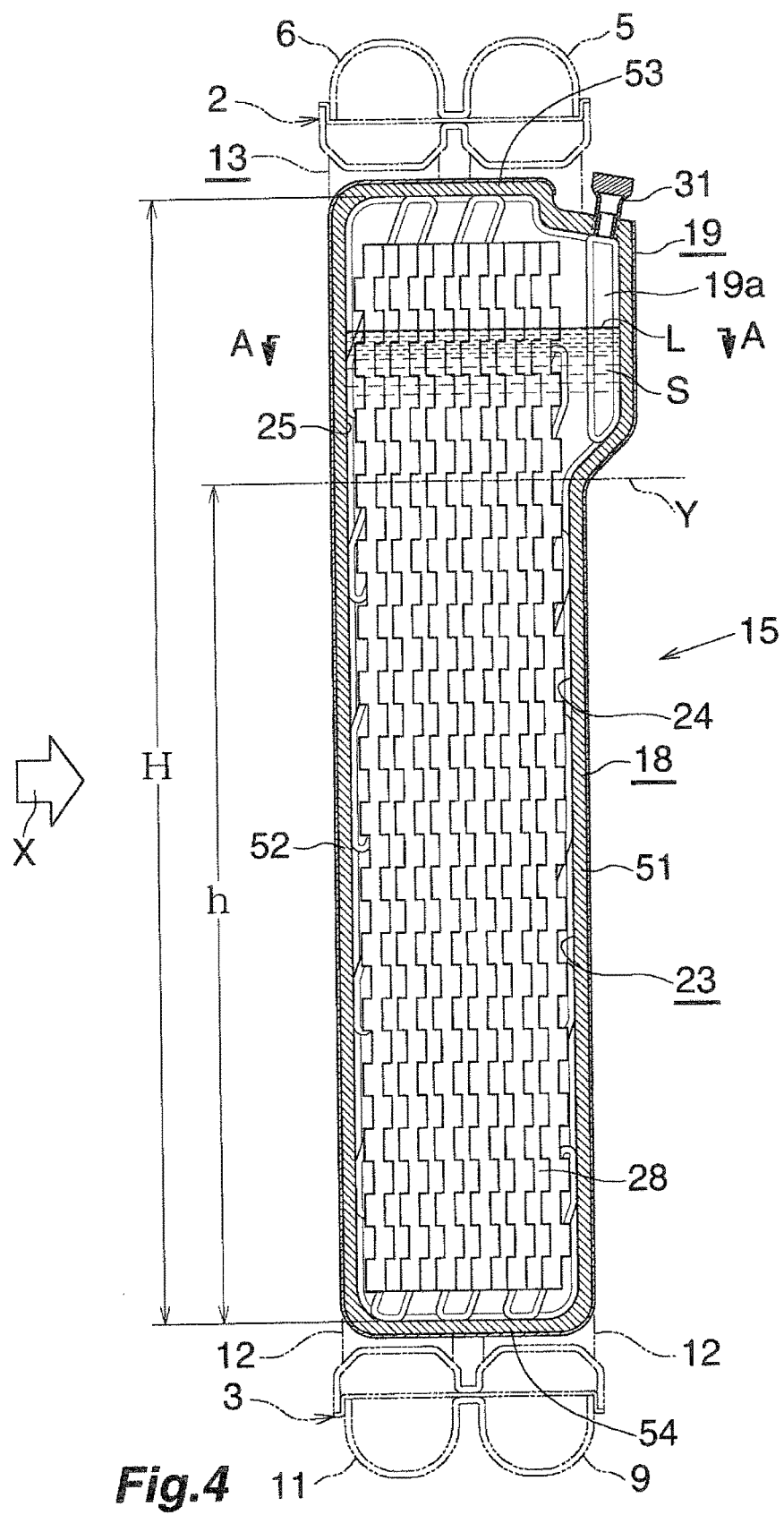
FIG. 4 is a side view of the cool storage material container of FIGS. 2 and 3 as viewed from the left side, with its left-side metal plate removed.
Figure 5:
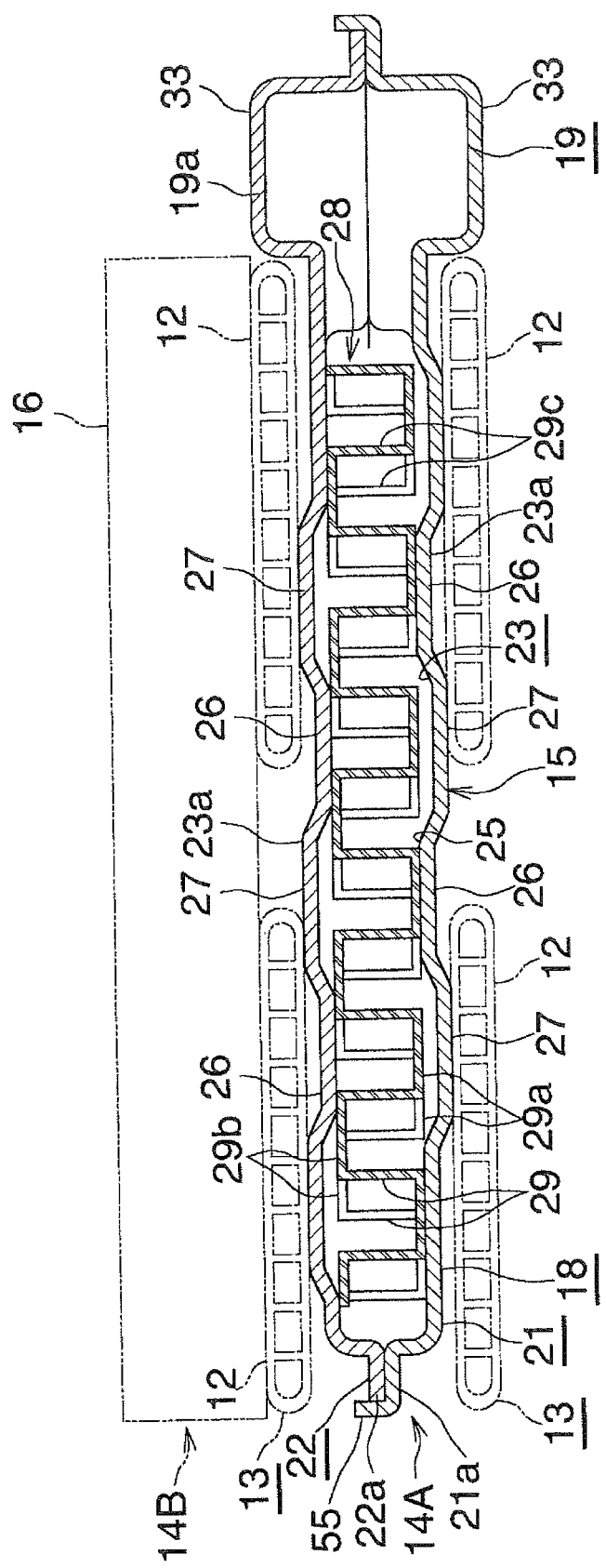
FIG. 5 is an enlarged sectional view taken along line A-A of FIG. 4.

FIG. 1 shows the overall configuration of an evaporator with a cool storage function according to the present invention, and FIGS. 2 to 5 show the configuration of an essential portion of the evaporator.

As shown in FIG. 1, an evaporator with a cool storage function 1 includes a first header tank 2 and a second header tank 3 formed of aluminum and disposed apart from each other in the vertical direction such that their longitudinal direction coincides with the left-right direction; and a heat exchange core section 4 provided between the two header tanks 2 and 3.

The first header tank 2 includes a leeward upper header section 5 located on the front side (downstream side in the air-passing direction); and a windward upper header section 6 located on the rear side (upstream side in the air-passing direction) and united with the leeward upper header section 5. A refrigerant inlet 7 is provided at the left end of the leeward upper header section 5, and a refrigerant outlet 8 is provided at the left end of the windward upper header section 6. The second header tank 3 includes a leeward lower header section 9 located on the front side, and a windward lower header section 11 located on the rear side and united with the leeward lower header section 9.

In the heat exchange core section 4, a plurality of flat refrigerant flow tubes 12 whose longitudinal direction coincides with the vertical direction, whose width direction coincides with the air-passing direction (the front-rear direction), and which are formed of aluminum are disposed in parallel such that they are spaced from one another in the left-right direction (the thickness direction of the refrigerant flow tubes 12). In the present embodiment, a plurality of pairs 13 each composed of two refrigerant flow tubes 12 spaced from each other in the front-rear direction are disposed at predetermined intervals in the left-right direction. A clearance 14A or 14B is formed between adjacent two of the pairs 13 each composed of the front and rear refrigerant flow tubes 12. An upper end portion of each front refrigerant flow tube 12 is connected to the leeward upper header section 5, and a lower end portion of each front refrigerant flow tube 12 is connected to the leeward lower header section 9. Similarly, an upper end portion of each rear refrigerant flow tube 12 is connected to the windward upper header section 6, and a lower end portion of each rear refrigerant flow tube 12 is connected to the windward lower header section 11.

A cool storage material container 15 which is formed of aluminum and which is filled with a cool storage material S is disposed in each of a plurality of clearances 14A which are a portion of all the clearances 14A and 14B of the heat exchange core section 4 and which are not adjacent from one another such that the cool storage material container 15 extends over the front and rear refrigerant flow tubes 12. The cool storage material container 15 is brazed to the front and rear refrigerant flow tubes 12 which constitute the left and right side pairs 13 forming the corresponding clearance 14A.

A corrugated outer fin 16 is disposed in each of the remaining clearances 14B of all the clearances 14A and 14B of the heat exchange core section 4 such that the corrugated outer fin 16 extends over the front and rear refrigerant flow tubes 12. The outer fin 16 is brazed to the front and rear refrigerant flow tubes 12 which constitute the left and right side pairs 13 forming the corresponding clearance 14B. Each of the outer fins 16 is formed from an aluminum brazing sheet having a brazing material layer on each of opposite surfaces thereof and which has crest portions extending in the front-rear direction, trough portions extending in the front-rear direction, and connection portions connecting the crest portions and the trough portions. In the present embodiment, one outer fin 16 is disposed in each of the clearances 14B adjacently located on the left and right sides of the clearance 14A in which the cool storage material container 15 is disposed, and a plurality of (two in the present embodiment) outer fins 16 are disposed between the cool storage material containers 15 located adjacent to each other in the left-right direction. Notably, the number of the outer fins 16 disposed between the cool storage material containers 15 located adjacent to each other in the left-right direction is not limited two, and may be three or more. Also, the outer fin 16, which is formed from an aluminum brazing sheet having a brazing material layer on each of opposite surfaces thereof, is disposed on the outer side of the pair 13 of the refrigerant flow tubes 12 located at the left end, and is disposed on the outer side of the pair 13 of the refrigerant flow tubes 12 located at the right end. These outer fins 16 are brazed to the corresponding front and rear refrigerant flow tubes 12. Furthermore, a side plate 17 formed of aluminum is disposed on the outer side of each of the outer fins 16 located at the left and right ends, respectively, and is brazed to the corresponding outer fin 16.

As shown in FIGS. 2 through 5, the leeward end of each outer fin 16 is located at the same position as the leeward end of the front (leeward) refrigerant flow tube 12 as viewed in the air-passing direction, and the windward end of each outer fin 16 is located at the same position as the windward end of the rear (windward) refrigerant flow tube 12 as viewed in the air-passing direction. Hereinafter, the straight distance between the front and rear ends of each outer fin 16 will be referred to as the full width of the heat exchange core section 4 in the air-passing direction.

In the case of the evaporator 1 of the present embodiment, refrigerant passes through the refrigerant inlet 7, enters the leeward upper header section 5 of the evaporator 1, and passes through all the refrigerant flow tubes 12. The refrigerant then flows out of the refrigerant outlet 8 of the windward upper header section 6.

Each cool storage material container 15 is composed of a container main body portion 18 and an outward projecting portion 19. The container main body portion 18 is a generally rectangular, flat hollow portion whose longitudinal direction coincides with the vertical direction and whose width direction coincides with the front-rear direction. The container main body portion 18 is located within the range of the heat exchange core section 4 in the air-passing direction, and is brazed to the front and rear (two) refrigerant flow tubes 12 of each of the corresponding pairs 13. The outward projecting portion 19 connects with only a portion (an upper portion in the present embodiment) of the front edge (leeward edge) of the container main body portion 18, and projects forward (outward in the air-passing direction) beyond the front ends of the outer fins 16. The outward projecting portion 19 of each cool storage material container 15 is provided to extend over a predetermined length from a position slightly shifted downward from the upper end of the cool storage material container 15.

Each cool storage material container 15 is composed of two generally rectangular container forming plates 21 and 22 which are elongated in the vertical direction, which are made of aluminum, and which have strip-like portions 21a and 22a extending along the peripheral edges thereof, each having a predetermined width, and brazed together. Each of the container forming plates 21 and 22 is formed, through press work, from an aluminum brazing sheet having a brazing material layer on each of opposite sides thereof. A hollow cool storage material containing portion 23 is formed in the cool storage material container 15 by outwardly bulging the two container forming plates 21 and 22, excluding the strip-like portions 21a and 22a thereof, in such a manner that the cool storage material containing portion 23 extends from the container main body portion 18 to the outward projecting portion 19. The cool storage material S is charged into the cool storage material containing portion 23. The cool storage material containing portion 23 has a first containing portion 24 and a second containing portion 25. The first containing portion 24 is present in a region of the cool storage material container 15 where only the container main body portion 18 is provided (a region below a chain line Y of FIG. 2). The second containing portion 25 extends upward from the first containing portion 24, and extends over the container main body portion 18 and the outward projecting portion 19 in a region of the cool storage material container 15 where the container main body portion 18 and the outward projecting portion 19 are provided (a region above the chain line Y of FIG. 2). The first containing portion 24 of the cool storage material containing portion 23 and a part of the second containing portion 25 thereof present in the container main body portion 18 have the same thickness in the left-right direction. Notably, the cool storage material containing portion 23 has a portion which extends upward from the second containing portion 25, which has a small height (dimension in the vertical direction), and whose width in the air-passing direction is smaller than that of the first containing portion 24.

It is preferred that a relation of $0.7 \leq h/H \leq 0.95$ be satisfied where h is the height (mm) of the first containing portion 24 of the cool storage material containing portion 23, and H is the height (mm) of the entire cool storage material containing portion 23.

Vertical strip-like brazed portions 51 and 52 which are continuous and straight, which are formed by the strip-like portions 21a and 22a of the two container forming plates 21 and 22 brazed together, and which extend in the vertical direction are provided on the leeward and windward sides of the first containing portion 24 of the cool storage material container 15. Also, horizontal strip-like brazed portions 53 and 54 which are continuous and straight, which are formed by the strip-like portions 21a and 22a of the two container forming plates 21 and 22 brazed together, and which extend in the air-passing direction are provided at the upper and lower ends of the cool storage material container 15. Also, at each of the leeward-side and windward-side vertical strip-like brazed portions 51 and 52 of the first containing portion 24 of the cool storage material container 15, an engagement portion 55 is provided at the outer end of one of the mutually brazed two strip-like portions 21a and 22a of the two container forming plates 21 and 22 constituting the cool storage material container 15 (in the present embodiment, the strip-like portion 21a of the left-side container forming plate 21). The engagement portion 55 projects outward from the outer end of the strip-like portion 22a of the right-side container forming plate 22, and is in engagement with the outer end of the strip-like portion 22a. Notably, in FIG. 5, the engagement portion on the leeward-side is not shown.

A plurality of condensed water drain passages 26 each having a first end located above a second end thereof and being opened at the two ends are formed on the outer surfaces of left and right side walls 23a of the container main body portion 18 of the cool storage material containing portion 23 of each cool storage material container 15 such that the condensed water drain passages 26 are spaced from one another. Each of the condensed water drain passages 26 gradually descends from the first end toward the second end. Each condensed water drain passage 26 is formed between two drain passage-forming convex portions 27 bulging outward from portions of the left and right side walls 23a of the cool storage material containing portion 23 of the cool storage material container 15, which portions are present at the container main body portion 18. At least one of the two drain passage-forming convex portions 27 which form a single condensed water drain passage 26 has a length greater than the width of the container main body portion 18 of the cool storage material container 15 as measured in the air-passing direction. The heights of all the drain passage-forming convex portions 27 are equal to one another and are lower than that of bulging portion-forming convex portions 33, which will be described later, and the drain passage-forming convex portions 27 are brazed to the front and rear refrigerant flow tubes 12 which constitute the left-hand side and right-hand side pairs 13 forming the corresponding clearance 14A. Notably, two adjacent condensed water drain passages 26 share a drain passage-forming convex portion 27 located between the two condensed water drain passages 26. The condensed water drain passages 26 and the drain passage-forming convex portions 27 of the left side wall 23a are slightly shifted from those of the right side wall 23a in the air-passing direction in the same horizontal plane such that the condensed water drain passages 26 and the drain passage-forming convex portions 27 of the left side wall 23a partially overlap (i.e., do not completely overlap) with those of the right side wall 23a. Notably, a small amount of air also flows through the condensed water drain passages 26.

A straight portion 27a extending in the vertical direction and having a predetermined length is provided at the leeward end portion of each of the drain passage-forming convex portions 27 which form the condensed water drain passages 26 which are a portion of all the condensed water drain passages 26 and whose upper ends are located at the first containing portion 24. As viewed in the left-right direction (from opposite sides in the direction in which the refrigerant flow pipes 12 are juxtaposed), that straight portion 27a and the leeward edge of the first containing portion 24 of the cool storage material containing portion 23 of the cool storage material container 15 are located on the same straight line, and fillets (not shown in FIG. 5) are formed between the leeward end portions of the above-mentioned drain passage-forming convex portions 27 and the corresponding front refrigerant flow pipe 12.

A staggered inner fin 28 formed of aluminum is disposed in the container main body portion 18 of each cool storage material container 15 such that the inner fin 28 extends over substantially the entire container main body portion 18 in the vertical direction. The inner fin 28 is formed by connecting together a plurality of wavy strips 29 disposed in parallel in the vertical direction. Each of the strips 29 has crest portions 29a extending in the vertical direction, trough portions 29b extending in the vertical direction, and connection portions 29c connecting the crest portions 29a and the trough portions 29b. The strips 29 are disposed such that the crest portions 29a and the trough portions 29b of one of two wavy strips 29 located adjacent to each other in the vertical direction are positionally shifted in the front-rear direction from the crest portions 29a and the trough portions 29b of the other wavy strip 29. The crest portions 29a, the trough portions 29b, and the connection portions 29c of each wavy strip 29 have the same length in the vertical direction. The inner fin 28 is brazed to the inner surfaces of portions of the left and right side walls 23a of the cool storage material containing portion 23 of the cool storage material container 15, which portions are present at the container main body portion 18. Specifically, the inner fin 28 is brazed to the inner surfaces in regions where the convex portions 26 are not formed. The bulging top walls of the convex portions 26 are not in contact with the inner fin 28 although the bulging top walls are in contact with the refrigerant flow tubes 12. Therefore, each of the portions of the left and right side walls 23a of the cool storage material containing portion 23 of the cool storage material container 15, which portions are present at the container main body portion 18, has contact portions which are in contact with the inner fin 28 and non-contact portions which are not in contact with the inner fin 28.

The outward projecting portion 19 of each cool storage material container 15 is provided to extend over a predetermined length from a position slightly shifted downward from the upper end of the front edge of the container main body portion 18. The length of the outward projecting portion 19 in the vertical direction is smaller than that of the container main body portion 18. It is preferred that the length of the outward projecting portion 19 in the vertical direction be equal to or less than 30% of the length of the cool storage material container 15 in vertical direction. Portions of the left and right side walls 23a of the cool storage material containing portion 23 of the cool storage material container 15, which portions are present at the outward projecting portion 19, form a bulging portion 19a which bulges leftward and rightward and whose dimension in the left-right direction is greater than that of the cool storage material containing portion 23. The bulging portion 19a is located on the outer side in the air-passing direction (downstream side in the air-passing direction) of the ends of the outer fins 16 on the downstream side in the air-passing direction. The bulging portion 19a is composed of bulging portion-forming convex portions 33 which are provided on the left and right side walls 23a of the cool storage material containing portion 23 and bulge outward.

It is preferred that a relation of $a/A \geq 0.15$ is satisfied, where A is the area ($mm^2$) of a part of the second containing portion 25 present at the container main body portion 18 and a is the area ($mm^2$) of a part of the second containing portion 25 present at the outward projecting portion 19, as measured on a cross section (horizontal cross section) of the second containing portion 25 of the cool storage material containing portion 23 taken perpendicular to the height direction of the cool storage material container 15.

A paraffin-based latent heat storage material S whose freezing point is adjusted to 5° C. to 10° C. is used as a cool storage material S which is charged into each cool storage material container 15. Specifically, pentadecane, tetradecane, or the like is used. In the case where the cool storage material S is in liquid phase at ordinary temperature (15 to 25° C.), the level L of the cool storage material S is located within the range of the second containing portion 25 of the cool storage material containing portion 23 in the vertical direction. Also, it is preferred that the cool storage material charging ratio, which is the ratio of the volume of the charged cool storage material S to the internal volume of the cool storage material containing portion 23 of each cool storage material container 15 be 70 to 90%. It is preferred that the upper end of the inner fin 28 be located above the level L of the cool storage material S charged in the cool storage material container 15. In this case, the cool storage material S is always in contact with the inner fin 28 at both the time of cool storage when cool is stored in the cool storage material S and at the time of cool release when the cool stored in the cool storage material S is released.

A cool storage material charging member 31 is fixed to the upper end of the outward projecting portion 19 of the cool storage material container 15. The cool storage material S is charged into the cool storage material containing portion 23 through the cool storage material charging member 31, and the cool storage material charging member 31 is sealed up after the charging of the cool storage material S into the cool storage material containing portion 23.

The above-described evaporator 1 with a cool storage function constitutes a refrigeration cycle in combination with a compressor driven by an engine of a vehicle, a condenser (refrigerant cooler) for cooling the refrigerant discharged from the compressor, and an expansion valve (pressure-reducing unit) for reducing the pressure of the refrigerant having passed through the condenser. The refrigeration cycle is installed, as a car air conditioner, in a vehicle, such as an automobile, which temporarily stops the engine, which serves as a drive source of the compressor, when the vehicle is stopped. When the compressor is operating, low pressure, two-phase refrigerant (a mixture of vapor refrigerant and liquid refrigerant) having been compressed by the compressor and having passed through the condenser and the expansion valve passes through the refrigerant inlet 7, and enters the leeward upper header section 5 of the evaporator 1. The refrigerant then passes through all the front refrigerant flow tubes 12, and flows out from the refrigerant outlet 8 of the windward upper header section 6. When the refrigerant flows through the refrigerant flow tubes 12, the refrigerant performs heat exchange with air passing through the clearances 14B, and flows out in vapor phase.

When the compressor is operating, the cool carried by the refrigerant flowing through the refrigerant flow tubes 12 is transferred directly to the cool storage material S within each cool storage material container 15 through the bulging top walls of the drain passage-forming convex portions 27 provided on the portions of the left and right side walls 23a of the cool storage material containing portion 23 of the cool storage material container 15, which portions are present at the container main body portion 18. Also, the cool is transferred from the bulging top walls of the drain passage-forming convex portions 27 to the entire cool storage material S within the cool storage material container 15 through the inner fin 28 and portions of the left and right side walls 23a, which portions are not brazed to the refrigerant flow tubes 12. Thus, the cool is stored in the cool storage material S.

Also, when the compressor is operating, condensed water produced on the surface of each cool storage material container 15 enters the condensed water drain passages 26 and accumulates in the condensed water drain passages 26 such that the condensed water is present along the drain passage-forming convex portions 27 located on the opposite sides of the corresponding condensed water drain passage 26 due to surface tension. When the amount of the accumulated condensed water increases, the gravity acting on the accumulated condensed water becomes larger than the surface tension. As a result, the condensed water flows downward within the condensed water drain passage 26, and is drained downward.

When the compressor stops, the cool stored in the cool storage material S within each cool storage material container 15 is transferred directly to the refrigerant flow tubes 12 through the bulging top walls of the drain passage-forming convex portions 27 provided on the portions of the left and right side walls 23a of the cool storage material containing portion 23 of the cool storage material container 15, which portions are present at the container main body portion 18. The stored cool is also transferred from the inner fin 28 to the refrigerant flow tubes 12 through the portions of the left and right side walls 23a, which portions are not brazed to the refrigerant flow tubes 12, and the bulging top walls of the drain passage-forming convex portions 27. The cool then passes through the refrigerant flow tubes 12 and propagates to the outer fins 16 brazed to the sides of the refrigerant flow tubes 12 opposite the cool storage material container 15. The cool transferred to the outer fins 16 is transferred to air passing through the clearances 14B adjacently located on the opposite sides of the clearance 14A in which the cool storage material container 15 is disposed. Accordingly, even when the temperature of air having passed through the evaporator 1 increases, the air is cooled, so that a sharp drop in the cooling capacity can be prevented.

Figure 6:
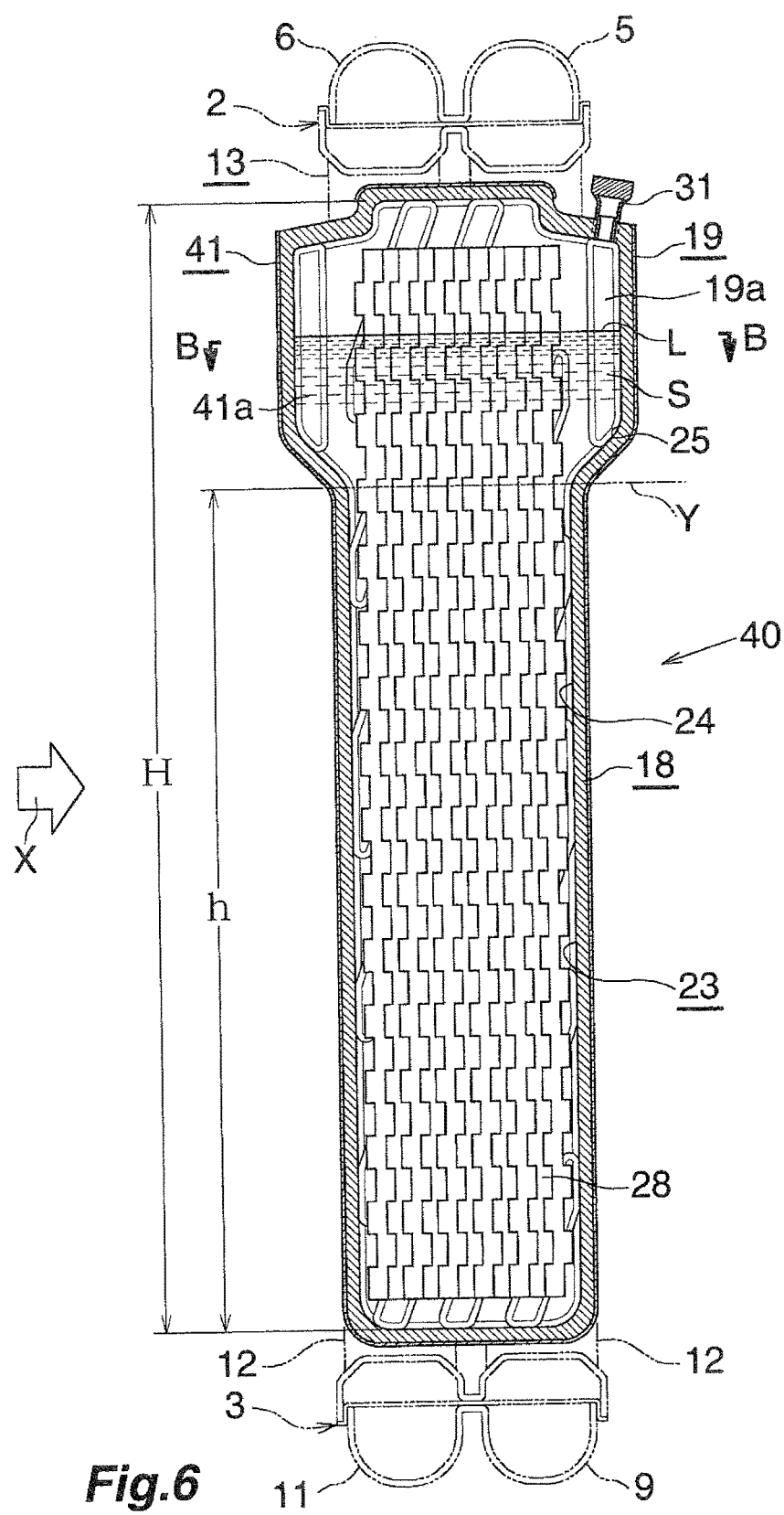
FIG. 6 is a view corresponding to FIG. 4 and showing a modification of the cool storage material container used in the evaporator with a cool storage function of FIG. 1.
Figure 7:
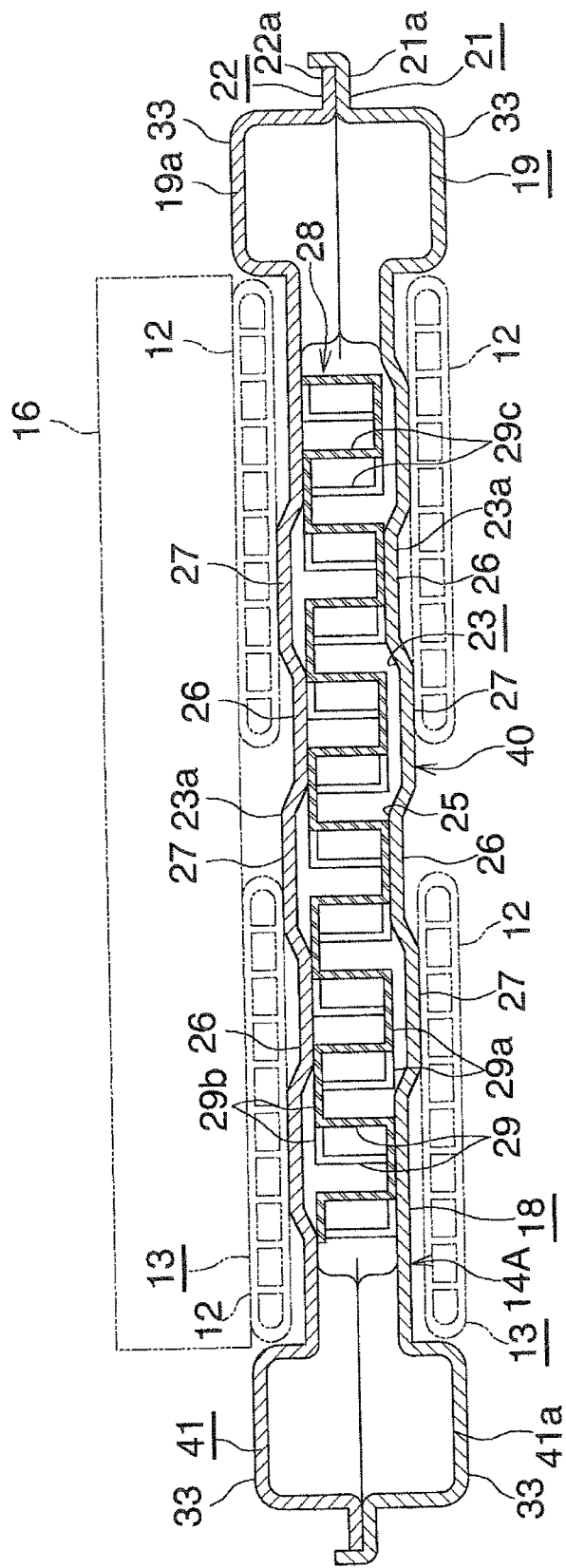
FIG. 7 is an enlarged sectional view taken along line B-B of FIG. 6.

FIGS. 6 and 7 show a modification of the cool storage material container used in the evaporator 1 with a cool storage function.

A cool storage material container 40 shown in FIGS. 6 and 7 includes not only the outward projecting portion 19 which connects with only a portion (an upper portion in the present embodiment) of the front edge (leeward edge) of the container main body portion 18 and bulges frontward (the outer side in the air-passing direction) beyond the front end of the outer fin 16, but also an outward projecting portion 41 which connects with only a portion (an upper portion in the present embodiment) of the rear edge (windward edge) of the container main body portion 18 and bulges rearward (the outer side in the air-passing direction) beyond the rear end of the outer fin 16. The two outward projecting portions 19 and 41 are provided symmetrically with respect to a vertical line passing through the center of the container main body portion 18 in the air-passing direction. Portions of the left and right side walls 23a of the cool storage material containing portion 23 of the cool storage material container 15, which portions are present at the outward projecting portion 41, form a bulging portion 41a which bulges leftward and rightward and whose dimension in the left-right direction is greater than that of the cool storage material containing portion 23. The bulging portion 41a is located on the outer side in the air-passing direction (upstream side in the air-passing direction) of the ends of the outer fins 16 on the upstream side in the air-passing direction. The bulging portion 41a is also composed of the bulging portion-forming convex portions 33 which are provided on the left and right side walls 23a of the cool storage material containing portion 23 and bulge outward.

The remaining structure is the same as that of the above-described cool storage material container 15.

Although not illustrated, the above-described cool storage material container used in the evaporator 1 with a cool storage function may have only the outward projecting portion 41 of the above-described cool storage material container 40 which projects rearward, instead of the outward projecting portion 19 of the cool storage material container 15.

Figure 8:
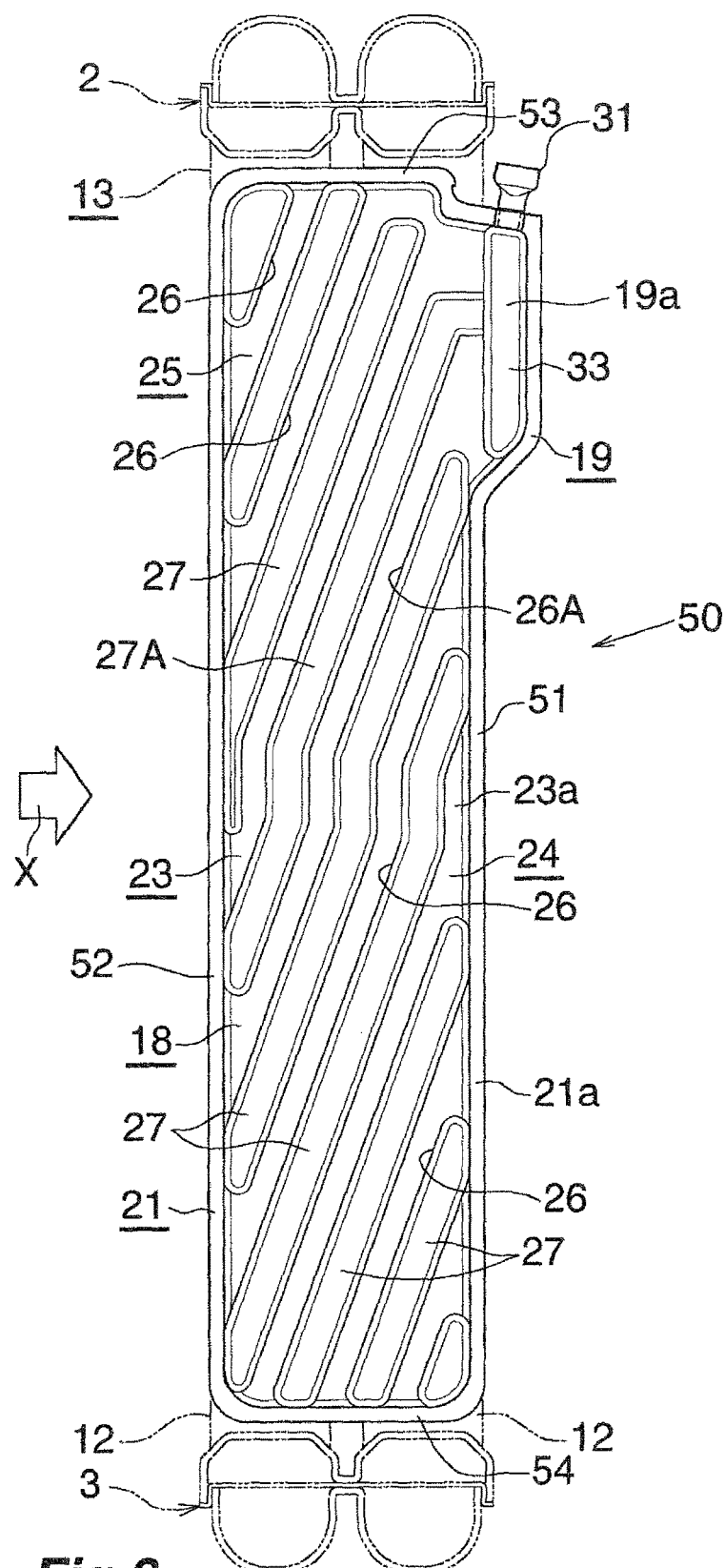
FIG. 8 is a view corresponding to FIG. 2 and showing another modification of the cool storage material container used in the evaporator with a cool storage function of FIG. 1.
Figure 9:
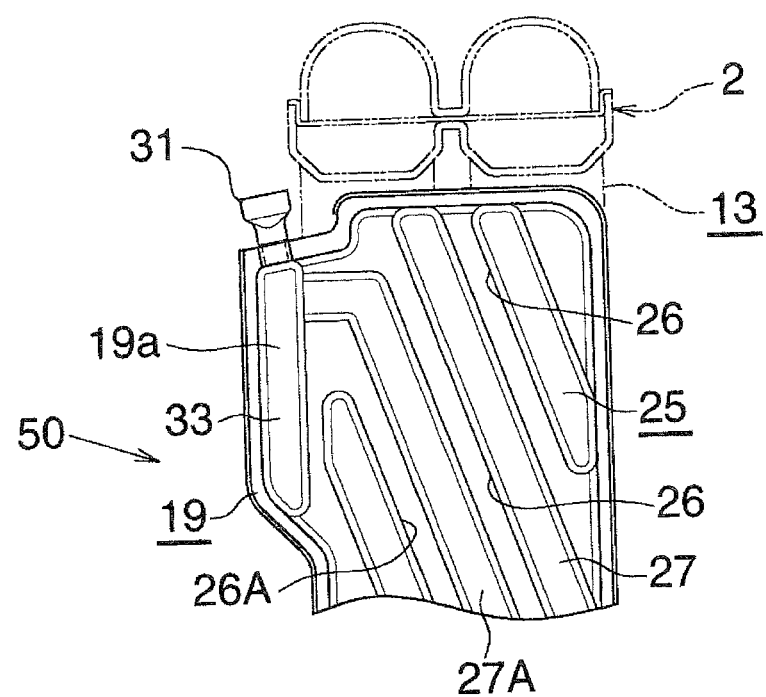
FIG. 9 is a right side view showing a portion of the cool storage material container used in the evaporator with a cool storage function of FIG. 8.

FIGS. 8 and 9 show another modification of the cool storage material container used in the evaporator with a cool storage function.

The upper ends of at least some drain passage-forming convex portions 27 of a cool storage material container 50 shown in FIGS. 8 and 9 are located within the range of the outward projecting portion 19 in the vertical direction, and and an upper end portion of at least one of the drain passage-forming convex portions 27 whose upper ends are located within the range of the outward projecting portion 19 in the vertical direction (one drain passage-forming convex portions 27 in this modification) extends toward the leeward side (toward the bulging portion-forming convex portion 33 of the outward projecting portion 19) and is integrally connected with the bulging portion-forming convex portion 33. The drain passage-forming convex portion whose upper end portion extends toward the leeward side and is integrally connected with the bulging portion-forming convex portion 33 is denoted by 27A. In other ward, the upper end openings of some of all the condensed water drain passages 26 are located within the range of the outward projecting portion 19 in the vertical direction, and an upper end portion of one of two drain passage-forming convex portions 27 forming a condensed water drain passage whose upper end opening is located within the range of the outward projecting portion 19 in the vertical direction (an upper end portion of the upper side drain passage-forming convex portion 27 in this modification) extends toward the leeward side (toward the bulging portion-forming convex portion 33 of the outward projecting portion 19) and is integrally connected with the bulging portion-forming convex portion 33. The condensed water drain passage whose upper end opening is located within the range of the outward projecting portion 19 in the vertical direction is denoted by 26A.

The condensed water drain passages 26 and the drain passage-forming convex portions 27 of one side wall 23a of the cool storage material containing portion 23 of the cool storage material container 50 are shifted from those of the other side wall 23a thereof in the air-passing direction in the same horizontal plane such that the condensed water drain passages 26 and the drain passage-forming convex portions 27 of the one side wall 23a partially overlap (i.e., do not completely overlap) with those of the other side wall 23a. Therefore, the vertical position of the upper end portion of one of two drain passage-forming convex portions 27 forming the condensed water drain passage 26A (the upper side drain passage-forming convex portion 27 in this modification) on one side wall 23a of the cool storage material containing portion 23 differs from that on the other side wall 23a thereof.

The remaining structure is the same as that of the above-described cool storage material container 15.

Figure 10:
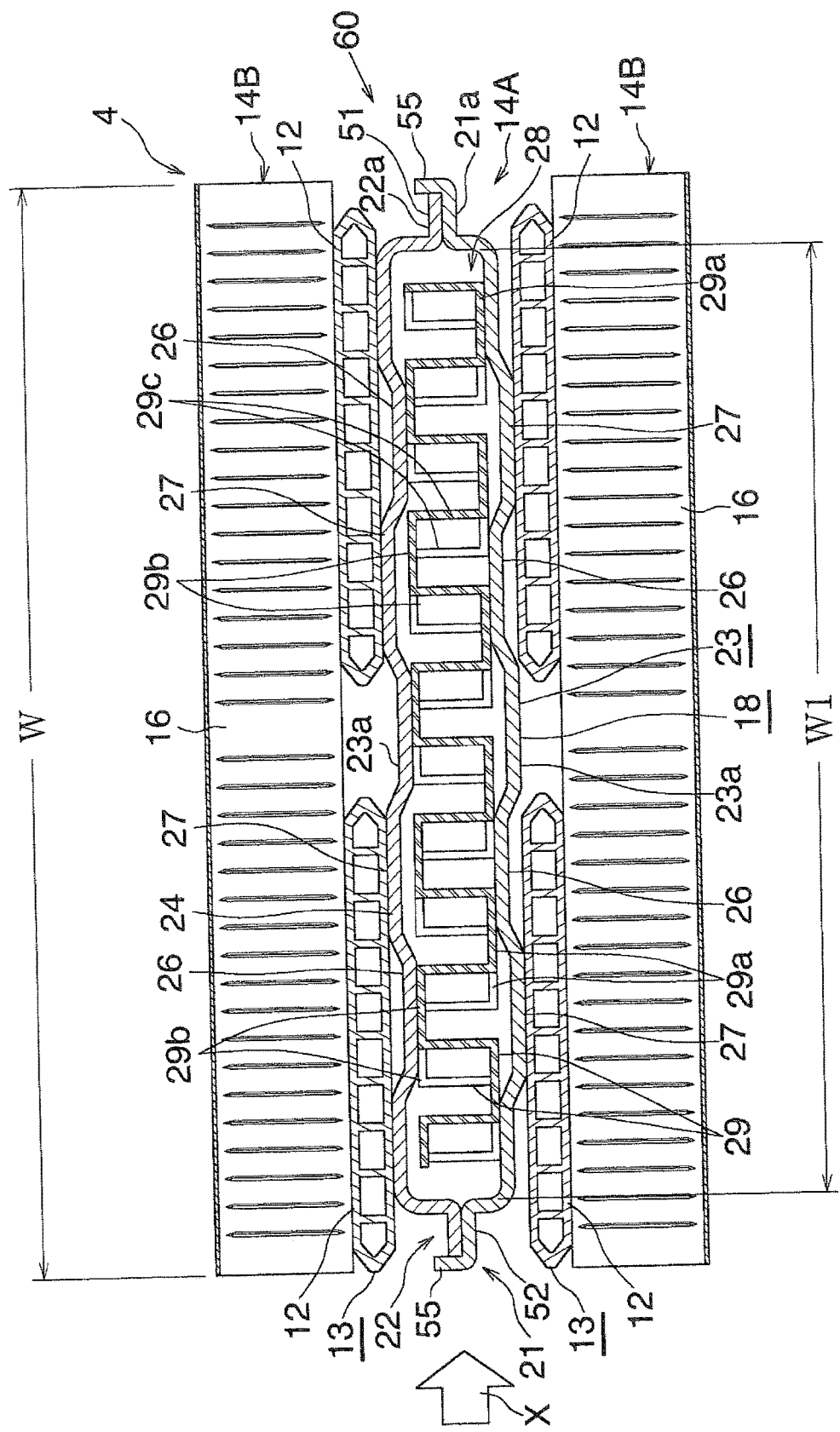
FIG. 10 is a horizontal sectional view of a first containing portion showing another modification of the cool storage material container used in the evaporator with a cool storage function of FIG. 1.
Figure 11:
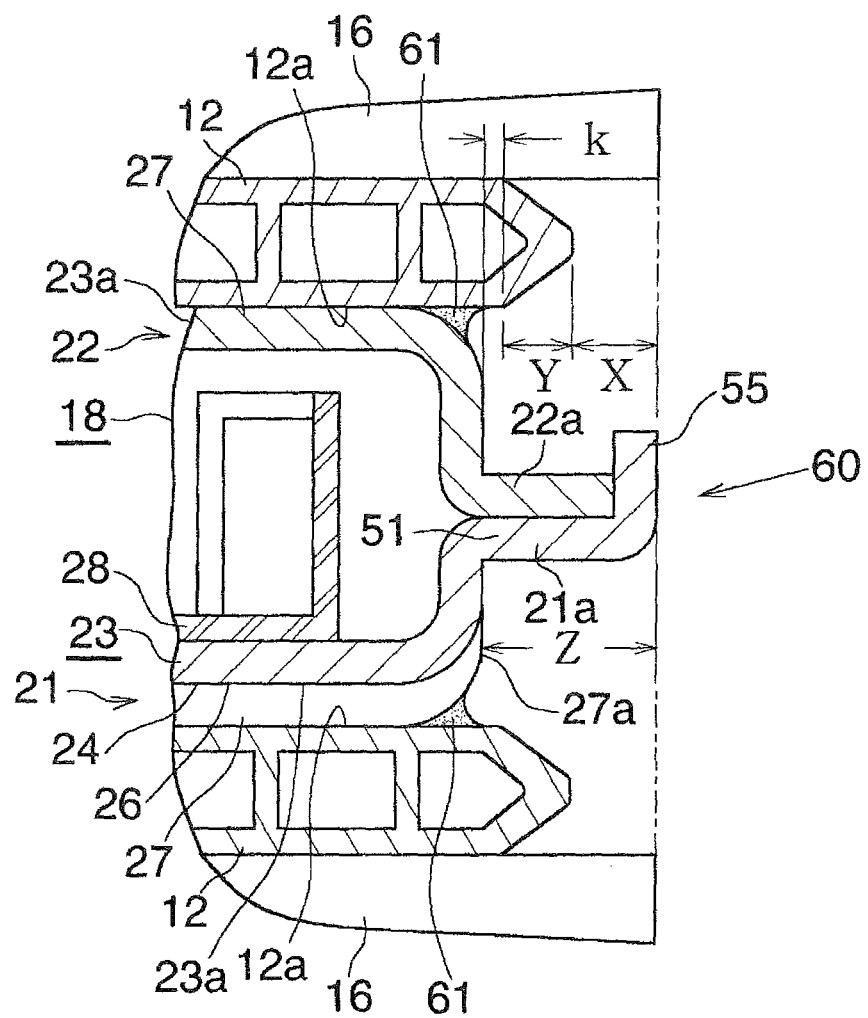
FIG. 11 is an enlarged view of a portion of FIG. 10.

FIGS. 10 and 11 show another modification of the cool storage material container used in the evaporator 1 with a cool storage function.

The leeward and windward edges of the first containing portion 24 of the cool storage material containing portion 23 portion of a cool storage material container 60 are vertical straight edges extending straight in the vertical direction, and the width W1 of the interior of the first containing portion 24 as measured in the air-passing direction is equal to or greater than 85% of the full width W of the heat exchange core section 4 as measured in the air-passing direction.

At the downstream end (end on the downstream side in the air-passing direction) of the clearance 14A in which the cool storage material container 60 is disposed, the leeward end of each front refrigerant flow tube 12 is located on the leeward side of the leeward end of the first containing portion 24 of the cool storage material containing portion 23 of the cool storage material container 60, and is located on the windward side of the leeward end of the leeward-side vertical strip-like brazed portion 51. It is preferred that a relation of Z−(X+Y)<1 be satisfied, where Z is the width (mm) (as measured in the air-passing direction) of the leeward-side vertical strip-like brazed portion 51 of the cool storage material container 60, including the engagement portion 55, X is the straight distance (mm) (as measured in the air-passing direction) between the leeward end of the leeward-side vertical strip-like brazed portion 51, including the engagement portion 55, and the leeward end of the front refrigerant flow tube 12, and Y is the straight distance (mm) (as measured in the air-passing direction) between the leeward end of the front refrigerant flow tube 12 and the leeward ends of mutually parallel flat portions 12a of the left and right side surfaces (side surfaces on opposite sides in the thickness direction) of the front refrigerant flow tube 12. Namely, it is preferred that the straight distance k (as measured in the air-passing direction) between the windward end of the leeward-side vertical strip-like brazed portion 51 and the leeward ends of the mutually parallel flat portions 12a of the left and right side surfaces of the front refrigerant flow tube 12 is less than 1 mm. Also, it is preferred that the above-described straight distance X be 2 mm or less.

At the upstream end (end on the upstream side in the air-passing direction) of the clearance 14A in which the cool storage material container 60 is disposed, the windward end of each rear refrigerant flow tube 12 and the windward end of the windward-side vertical strip-like brazed portion 52 of the cool storage material container 60 are located at the same position in the air-passing direction. Further, the leeward end of the leeward-side vertical strip-like brazed portion 51 and the windward end of the windward-side vertical strip-like brazed portion 52 are located at the same positions (in the air-passing direction) as the leeward and windward ends of the outer fins 16. Further, the width of each outer fin 16; i.e., the straight distance between the leeward and windward ends of each outer fin 16, is equal to the full width W of the heat exchange core section 4 as measured in the air-passing direction.

A straight portion 27a extending in the vertical direction and having a predetermined length is provided at the leeward end portion of each of the drain passage-forming convex portions 27 which form the condensed water drain passages 26 which are a portion of all the condensed water drain passages 26 and whose upper ends are located at the first containing portion 24. As viewed in the left-right direction (from opposite sides in the direction in which the refrigerant flow pipes 12 are juxtaposed), that straight portion 27a and the leeward edge of the first containing portion 24 of the cool storage material containing portion 23 of the cool storage material container 60 are located on the same straight line, and fillets 61 are formed between the leeward end portions of the above-mentioned drain passage-forming convex portions 27 and the corresponding front refrigerant flow pipe 12.

The present invention comprises the following modes.

1) An evaporator with a cool storage function comprising:
a plurality of flat refrigerant flow tubes disposed in parallel in a heat exchange core section thereof such that the refrigerant flow tubes are spaced from one another in a thickness direction of the refrigerant flow tubes, a longitudinal direction of the refrigerant flow tubes coinciding with a vertical direction, and a width direction of the refrigerant flow tubes coinciding with an air-passing direction, whereby each of clearances is formed between adjacent refrigerant flow tubes;

cool storage material containers each of which is charged with a cool storage material, which are disposed in a plurality of clearances which are a portion of all the clearances, and which are brazed to the corresponding refrigerant flow tubes; and fins which are disposed in the remaining clearances and which are brazed to the corresponding refrigerant flow tubes, one of the fins being disposed in at least one of clearances on opposite sides of a clearance in which one of the cool storage material containers is disposed, a cool storage material containing portion being provided in each cool storage material container, and the cool storage material being charged into the cool storage material containing portion, wherein each cool storage material container includes a container main body portion located within a range of the heat exchange core section in the air-passing direction, and an outward projecting portion which connects with only an upper portion of at least one of leeward and windward edges of the container main body portion, which projects outward of the refrigerant flow tubes in the air-passing direction, and whose length in the vertical direction is shorter than that of the container main body portion;

the cool storage material containing portion is provided to extend over the container main body portion and the outward projecting portion;

the cool storage material containing portion has a first containing portion which is present in a region of the cool storage material container where only the container main body portion is provided, and a second containing portion which extends upward from the first containing portion and extends over the container main body portion and the outward projecting portion in a region of the cool storage material container where the container main body portion and the outward projecting portion are provided; and the cool storage material has a level which is located within a vertical range of the second containing portion of the cool storage material containing portion in the case where the cool storage material is in liquid phase at ordinary temperature.

2) An evaporator with a cool storage function according to par. 1), wherein the outward projecting portion of each cool storage material container is provided at only a leeward edge of the container main body portion of the cool storage material container.

3) An evaporator with a cool storage function according to par. 1), wherein the outward projecting portion of each cool storage material container is provided at only a windward edge of the container main body portion of the cool storage material container.

4) An evaporator with a cool storage function according to par. 1), wherein the outward projecting portion of each cool storage material container is provided at each of leeward and windward edges of the container main body portion of the cool storage material container.

5) An evaporator with a cool storage function according to par. 1), wherein a relation of 0.7≤h/H≤0.95 is satisfied where h is a height (mm) of the first containing portion of the cool storage material containing portion, and H is a height (mm) of the entire cool storage material containing portion.

6) An evaporator with a cool storage function according to par. 1), wherein a relation of a/A≥0.15 is satisfied, where A is an area (mm$^2$) of a part of the second containing portion present at the container main body portion and a is an area (mm$^2$) of a part of the second containing portion present at the outward projecting portion, as measured on a cross section of the second containing portion of the cool storage material containing portion taken perpendicular to a height direction of the cool storage material container.

7) An evaporator with a cool storage function according to par. 1), wherein a cool storage material charging ratio, which is the ratio of a volume of the charged cool storage material to an internal volume of the cool storage material containing portion of each cool storage material container is 70 to 90%.

8) An evaporator with a cool storage function according to par. 1), wherein a plurality of condensed water drain passages are formed on outer surfaces of two side walls of the cool storage material containing portion of each cool storage material container such that the condensed water drain passages are spaced from one another, the side walls being located on opposite sides in the direction of arrangement of the refrigerant flow tubes;

each of the condensed water drain passages is formed between two drain passage-forming convex portions which are provided on the two side walls of the cool storage material containing portion, are bulged outward, and are brazed to the corresponding refrigerant flow tubes;

portions of the two side walls of the cool storage material containing portion of the cool storage material container, which portions are present at the outward projecting portion, form a bulging portion which bulges toward opposite sides in the direction of arrangement of the refrigerant flow tubes and whose dimension in the direction of arrangement of the refrigerant flow tubes is greater than that of the cool storage material containing portion, the bulging portion being composed of bulging portion-forming convex portions which are provided on two side walls of the material containing portion located on opposite sides in the direction of arrangement of the refrigerant flow tubes and bulge outward;

a first end of each condensed water drain passage is located above a second end thereof, and opposite ends of each condensed water drain passage are opened; and a first end of each drain passage-forming convex portion is located above a second end thereof, the first ends of at least some drain passage-forming convex portions are located within a range of the outward projecting portion in the vertical direction, and at least one of the drain passage-forming convex portions whose first ends are located within the range of the outward projecting portion in the vertical direction extends toward the corresponding bulging portion-forming convex portion and is integrally connected with the bulging portion-forming convex portion.

9) An evaporator with a cool storage function according to par. 8), wherein the condensed water drain passages and the drain passage-forming convex portions of one side wall of the cool storage material containing portion of the cool storage material container are shifted from those of the other side wall thereof in the air-passing direction in the same horizontal plane such that the condensed water drain passages and the drain passage-forming convex portions of the one side wall partially overlap but do not completely overlap with those of the other side wall; and a vertical position of the upper end portion of the drain passage-forming convex portion integrally connected with the bulging portion-forming convex portion on one side wall of the cool storage material containing portion differs from that on the other side wall thereof.

10) An evaporator with a cool storage function according to par. 8), wherein the bulging portion-forming convex portions have a projection height greater than that of the drain passage-forming convex portions.

11) An evaporator with a cool storage function according to par. 8), wherein each cool storage material container is composed of two container forming plates which are made of a metal and which have strip-like portions extending along peripheral edges thereof, each having a predetermined width, and brazed together;

the cool storage material containing portion having a bulging shape is provided in the cool storage material container by outwardly bulging the two container forming plates, excluding the strip-like portions brazed together; and the drain passage-forming convex portions and the bulging portion-forming convex portions are formed on portions of the container forming plates which become the side walls of the cool storage material containing portion.

12) An evaporator with a cool storage function according to par. 1), wherein each cool storage material container is composed of two container forming plates which are made of a metal and which have strip-like portions extending along peripheral edges thereof, each having a predetermined width, and brazed together;

the cool storage material containing portion having a bulging shape is provided in the cool storage material container by outwardly bulging at least one of the two container forming plates, excluding the strip-like portions brazed together;

leeward-side and windward-side vertical strip-like brazed portions which are continuous and straight and each of which is formed of the strip-like portions of the two container forming plates brazed together, has a length equal to or greater than 70% of a length of the cool storage material container in the vertical direction, and has a predetermined width are provided on leeward and windward sides of the first containing portion;

a dimension of the first containing portion in the air-passing direction is equal to a straight distance between the two vertical strip-like brazed portions in the air-passing direction, and is equal to or greater than 85% of a dimension of the heat exchange core section in the air-passing direction;

at one end of the clearance between adjacent refrigerant flow tubes, the one end being located on a downstream side of the clearance in the air-passing direction, leeward ends of the refrigerant flow tubes are located leeward of an leeward end of the first containing portion and is located windward of an leeward end of the leeward-side vertical strip-like brazed portion of the cool storage material container; and at the other end of the clearance located on an upstream side of the clearance in the air-passing direction, windward ends of the refrigerant flow tubes and a windward end of the windward-side vertical strip-like brazed portion of the cool storage material container are located at the same position in the air-passing direction.

13) An evaporator with a cool storage function according to par. 12), wherein the leeward end of the leeward-side vertical strip-like brazed portion of each cool storage material container and the leeward end of each fin are located at the same position in the air-passing direction;

the windward end of the windward-side vertical strip-like brazed portion and the windward end of each fin are located at the same position in the air-passing direction; and a straight distance between the leeward and windward ends of each fin is equal to a full width of the heat exchange core section in the air-passing direction.

14) An evaporator with a cool storage function according to par. 12), wherein at each of the leeward and windward vertical strip-like brazed portions of each cool storage material container, an engagement portion is provided at an outer end, in the air-passing direction, of one of the mutually brazed two strip-like portions of the two container forming plates constituting the cool storage material container; and the engagement portion projects outward in the air-passing direction from an outer end, in the air-passing direction, of the other strip-like portion, and is in engagement with the outer end of the other strip-like portion.

15) An evaporator with a cool storage function according to par. 14), wherein, at a downstream end, in the air-passing direction, of the clearance in which the cool storage material container is disposed, a relation of $Z-(X+Y)<1$ is satisfied, where Z is a width (mm), as measured in the air-passing direction, of the leeward-side vertical strip-like brazed portion of the cool storage material container, including the engagement portion, X is a straight distance (mm), as measured in the air-passing direction, between the leeward end of the leeward-side vertical strip-like brazed portion, including the engagement portion, and the leeward end of the refrigerant flow tube, and Y is a straight distance (mm), as measured in the air-passing direction, between the leeward end of the refrigerant flow tube and leeward ends of mutually parallel flat portions of side surfaces of the refrigerant flow tube located on opposite sides thereof in a thickness direction of the refrigerant flow tube.

16) An evaporator with a cool storage function according to par. 15), wherein the straight distance X is 2 mm or less.

17) An evaporator with a cool storage function according to par. 12), wherein a plurality of convex portions each bulging outward and having a flat bulging top wall are formed on side walls of the cool storage material containing portion located on opposite sides thereof in a direction in which the refrigerant flow tubes are juxtaposed;

at least a portion of the bulging top walls of the convex portions are brazed to the corresponding refrigerant flow tubes;

leeward ends of at least a portion of the convex portions and the leeward end of the first containing portion are located at the same position in the air-passing direction; and fillets are formed between the leeward ends of the convex portions and the corresponding refrigerant flow tubes.

18) An evaporator with a cool storage function according to par. 17), wherein a plurality of condensed water drain passages are formed at predetermined intervals on the outer surfaces of the side walls of the cool storage material containing portion located on opposite sides thereof in the direction in which the refrigerant flow tubes are juxtaposed;

one end of each of at least some condensed water drain passages is open on the leeward side of the first containing portion;

each condensed water drain passage is formed between two convex portions which are provided on the opposite side walls of the cool storage material containing portion, which bulge outward, and each of which has a flat bulging top wall; and the leeward ends of the convex portions forming the condensed water drain passages whose one ends are open on the leeward side of the first containing portion are located at the same position in the air-passing direction as the leeward edge of the first containing portion.

19) An evaporator with a cool storage function according to par. 18), wherein each of the condensed water drain passages gradually descends from the upper end toward the lower end, and is open at the opposite ends; and the upper ends of some condensed water drain passages of all the condensed water drain passages are open on the leeward side of the first containing portion of the cool storage material containing portion.

20) An evaporator with a cool storage function according to par. 19), wherein a straight portion extending in the vertical direction and having a predetermined length is provided at each of the leeward ends of the convex portions which form the condensed water drain passages whose upper ends are open on the leeward side of the first containing portion of the cool storage material containing portion;

as viewed from opposite sides in the direction in which the refrigerant flow tubes are juxtaposed, the straight portion and the leeward edge of the first containing portion are located on the same straight line; and fillets are formed between the leeward ends of the convex portions and the refrigerant flow tubes.

21) An evaporator with a cool storage function according to par. 1), wherein a plurality of tube sets each composed of a plurality of flat refrigerant flow tubes whose longitudinal direction coincides with the vertical direction, whose width direction coincides with the air-passing direction, and which are disposed such that they are spaced from one another in the air-passing direction are disposed at predetermined intervals in the thickness direction of the refrigerant flow tubes;

each of the clearances is formed between adjacent tube sets; and each of the cool storage material containers and the fins is disposed in a clearance such that the cool storage material container or the fin extends over the refrigerant flow tubes juxtaposed in the air-passing direction, and the cool storage material container or the fin is brazed to the refrigerant flow tubes of two tube sets which form the clearance in which the cool storage material container or the fin is disposed.

22) An evaporator with a cool storage function according to par. 1), wherein a fin is disposed in each of the clearances adjacently located on the left and right sides of the clearance in which the cool storage material container is disposed.

According to the evaporator with a cool storage function of any of pars. 1) through 22), each cool storage material container includes a container main body portion located within a range of the heat exchange core section in the air-passing direction, and an outward projecting portion which connects with only an upper portion of at least one of leeward and windward edges of the container main body portion, which projects outward of the refrigerant flow tubes in the air-passing direction, and whose length in the vertical direction is shorter than that of the container main body portion; the cool storage material containing portion is provided to extend over the container main body portion and the outward projecting portion; the cool storage material containing portion has a first containing portion which is present in a region of the cool storage material container where only the container main body portion is provided, and a second containing portion which extends upward from the first containing portion and extends over the container main body portion and the outward projecting portion in a region of the cool storage material container where the container main body portion and the outward projecting portion are provided; and the cool storage material has a level which is located within a vertical range of the second containing portion of the cool storage material containing portion in the case where the cool storage material is in liquid phase at ordinary temperature. Therefore, as compared with the case where the outward projecting portion is not provided, the internal volume of the cool storage material containing portion of each cool storage material container can be increased. Thus, in the case where the cool storage material charging ratio, which is the ratio of the volume of the charged cool storage material to the internal volume of the single closed space in the cool storage material container, is set to the same value, the level of the cool storage material in the case where the cool storage material is in liquid phase can be raised. Accordingly, even in the vicinity of the upper end of the cool storage material container, cool can be stored in the cool storage material within the cool storage material container. Thus, when a compressor stops, it is possible to suppress an increase in the temperature of air following through a portion of the heat exchange core section corresponding to the vicinity of the upper end of the cool storage material container, and to suppress a variation in blown air temperature, which is the temperature of air passing through the evaporator with a cool storage function.

In addition, as compared with the case where the outward projecting portion which projects outward of the refrigerant flow tubes is provided over the entire length of the cool storage material container in the vertical direction, the size and weight of the evaporator can be decreased, and the area of a portion of the cool storage material container which is not in contact with the refrigerant flow tubes can be decreased, whereby a large amount of the cool storage material contained in the cool storage material containing portion of the cool storage material container can be cooled effectively.

According to the evaporator with a cool storage function of any of pars. 5) through 7), when the compressor stops, it is possible to effectively suppress a variation in blown air temperature, which is the temperature of air passing through the evaporator with a cool storage function.

According to the evaporator with a cool storage function of pars. 8) and 9), the strength of the outward projecting portion of each cool storage material container against forces in the direction of arrangement of the refrigerant flow tubes can be increased.

According to the evaporator with a cool storage function of par. 11), the cool storage material containing portion, the drain passage-forming convex portions, and the bulging portion-forming convex portions of the cool storage material container can be provided relatively easily. In addition, one of the two drain passage-forming convex portions which form the condensed water drain passage whose upper end opening is located within the range of the outward projecting portion in the vertical direction can be relatively easily extended toward the corresponding bulging portion-forming convex portion and be integrally connected with the bulging portion-forming convex portion.

According to the evaporator with a cool storage function of any of pars. 12) through 20), the width (in the air-passing direction) of the interior of a heat transfer portion of the cool storage material containing portion can be made relatively large, and the amount of the cool storage material which can be contained in the cool storage material containing portion can be made relatively large. Therefore, a cool storage effect of storing cool in the cool storage material is enhanced. Further, at one end (located on the downstream side in the air-passing direction) of the clearance in which the cool storage member container is disposed, the leeward ends of the refrigerant flow tubes are located leeward of the leeward end of the first containing portion and are located windward of the leeward end of the leeward-side vertical strip-like brazed portion of the cool storage material container; and at the other end of the clearance located on the upstream side in the air-passing direction, the windward ends of the refrigerant flow tubes and the windward end of the windward-side vertical strip-like brazed portion of the cool storage material container are located at the same position in the air-passing direction. Therefore, it is possible to prevent a remarkable increase in the width of the heat exchange core section in the air-passing direction, while making the dimension of the interior of the first containing portion of the cool storage material containing portion in the air-passing direction equal to or greater than 85% of the dimension of the heat exchange core section in the air-passing direction. As a result, it is possible to suppress an increase in the size of the evaporator with a cool storage function.

According to the evaporator with a cool storage function of par. 13), it is possible to relatively simply perform an operation of combining the refrigerant flow tubes (or members for forming the refrigerant flow tubes), the container forming plates, and the fins at the time of temporary assembly performed before brazing of various members in a production process.

According to the evaporator with a cool storage function of par. 14), it is possible to simply performs an operation of combining the two container forming plates, without causing positional shift, at the time of temporary assembly performed before brazing of various members in a production process.

According to the evaporator with a cool storage function of par. 15), it is possible to effectively perform the enhancement of the cool storage effect described in par. 1) and the suppression of an increase in the size of the evaporator with a cool storage function.

According to the evaporator with a cool storage function of par. 16), it is possible to effectively prevent a remarkable increase in the width of the heat exchange core section in the air-passing direction within a range in which the drainage of water from the leeward ends of the fins is not deteriorated.

According to the evaporator with a cool storage function of par. 17), even in the case where the area of contact between the outer surface of the bulging top wall of each convex portion and the corresponding refrigerant flow tube decreases because of formation of a rounded portion between the outer surface of the bulging top wall of the convex portion and the outer surface of the circumferential wall thereof, a drop in the heat conduction between the convex portion and the refrigerant flow tube can be suppressed.

According to the evaporator with a cool storage function of par. 18), it is possible to obtain the same effect as that of the evaporator with a cool storage function of par. 17), while securing the drainage of condensed water.

According to the evaporator with a cool storage function of par. 19), condensed water flows downward toward the windward side, which decreases the speed of drainage of condensed water, and the sensible heat of condensed water itself contributes to elongation of the cool release duration. Also, even in the case where the evaporator with a cool storage function is disposed in the casing of a car air conditioner in an inclined attitude such that the upper end side is located on the windward side, the condensed water drain passages extends approximately vertically. Therefore, the drainage of condensed water can be secured.

According to the evaporator with a cool storage function of par. 20), even in the case where the area of contact between the outer surface of the bulging top wall of each convex portion and the corresponding refrigerant flow tube decreases because of formation of a rounded portion between the outer surface of the bulging top wall of the convex portion and the outer surface of the circumferential wall thereof, a drop in the heat conduction between the convex portion and the refrigerant flow tube can be suppressed.

What is claimed is:

1. An evaporator with a cool storage function, comprising:
    a first refrigerant flow tube including a first tube wall and a second tube wall opposite to the first tube wall in a thickness direction along a thickness of the first refrigerant flow tube, the thickness direction being substantially perpendicular to a height direction along a height of the evaporator and a width direction along a width of the evaporator, the height direction being substantially perpendicular to the width direction;
    a second refrigerant flow tube including a third tube wall and a fourth tube wall opposite to the third tube wall in the thickness direction, the first refrigerant flow tube and the second refrigerant flow tube being arranged such that the second tube wall is opposite to the third tube wall in the thickness direction; and
    a cool storage material container including a first container wall and a second container wall opposite to the first container wall in the thickness direction, the cool storage material container being provided between the first refrigerant flow tube and the second refrigerant flow tube such that the first container wall contacts the second tube wall of the first refrigerant flow tube and the second container wall contacts the third tube wall of the second refrigerant flow tube, the cool storage material container comprising:
        a first containing portion;
        a second containing portion provided above the first containing portion in the height direction to communicate with the first containing portion and including an outward projecting portion projecting in the width direction from the first refrigerant flow tube and the second refrigerant flow tube; and
        a cool storage material filling the first containing portion and having a liquid level in the outward projecting portion when the cool storage material is in a liquid phase and the evaporator is positioned such that the height direction is oriented substantially in a vertical direction.

2. The evaporator according to claim 1, wherein a relation of $0.7 \leq h/H \leq 0.95$ is satisfied where h is a height of the first containing portion of the cool storage material containing portion, and H is a height of a sum of the height of the first containing portion and a height of the second containing portion.

3. The evaporator according to claim 1, wherein the cool storage material is charged in the cool storage material container to fill 70% to 90% of a sum volume of a volume of the first containing portion and a volume of the second containing portion.

4. The evaporator according to claim 1, wherein the cool storage material container is brazed to the first refrigerant flow tube and the second refrigerant flow tube.

5. The evaporator according to claim 1, further comprising:
   a fin provided on the first tube wall of the first refrigerant flow tube.

6. The evaporator according to claim 1, wherein the first containing portion is provided not to be seen when viewed in the thickness direction.

7. The evaporator according to claim 1, wherein the width direction is oriented substantially in an air-passing direction along which air flows through the evaporator.

* * * * *